(12) United States Patent
Zuehl et al.

(10) Patent No.: US 8,465,371 B2
(45) Date of Patent: Jun. 18, 2013

(54) TORSIONAL VIBRATION DAMPER ASSEMBLY FOR A HYDRODYNAMIC COUPLING DEVICE

(75) Inventors: Carsten Zuehl, Schweinfurt (DE); Michael Scordino, Canton, MI (US); Vikas Sinha, Northville, MI (US); Ryan Brookshire, Schweinfurt (DE); Erwin Wack, Niederwerrn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 558 days.

(21) Appl. No.: 12/459,429

(22) Filed: Jul. 1, 2009

(65) Prior Publication Data
US 2010/0022312 A1  Jan. 28, 2010

(30) Foreign Application Priority Data
Jul. 2, 2008 (DE) .......................... 10 2008 040 080

(51) Int. Cl.
*F16F 15/121* (2006.01)
(52) U.S. Cl.
USPC ........................................................ 464/68.1
(58) Field of Classification Search
USPC ................... 464/64.1, 67.1, 8.1, 68.9, 68.1; 192/3.28–3.3, 55.61, 212; 60/338
See application file for complete search history.

(56) References Cited

U.S. PATENT DOCUMENTS

| | | | |
|---|---|---|---|
| 5,080,215 A | 1/1992 | Förster et al. | |
| 5,386,896 A * | 2/1995 | Matsuoka | 192/3.29 |
| 5,697,846 A * | 12/1997 | Uenohara | 464/68.1 |
| 6,142,272 A * | 11/2000 | Meisner et al. | 192/3.29 |
| 7,743,900 B2 * | 6/2010 | Breier | 464/68.1 |
| 2001/0007383 A1 * | 7/2001 | Schmid | 192/3.29 |
| 2004/0060793 A1 * | 4/2004 | Dacho et al. | 192/3.29 |

FOREIGN PATENT DOCUMENTS

| | | |
|---|---|---|
| DE | 39 34 798 | 4/1991 |
| DE | 43 33 562 | 4/1994 |
| DE | 10 2006 022 459 | 12/2006 |

* cited by examiner

*Primary Examiner* — Gregory Binda
*Assistant Examiner* — Josh Skroupa
(74) *Attorney, Agent, or Firm* — Cozen O'Connor

(57) ABSTRACT

A torsional vibration damper assembly for a hydrodynamic coupling device, in particular a torque converter, comprises a primary side having a plurality of cover disk elements, a secondary side which is rotatable with respect to the primary side about an axis of rotation against the action of a plurality of damper springs, a central disk element engaging between the cover disk elements, and a turbine wheel having a turbine wheel shell. The plurality of cover disk elements are fixedly connected to one another on the radial outer side of the damper springs, and a cover disk element located directly adjacent to the turbine wheel shell is fixedly connected to the turbine wheel shell on the radial inner side of the damper springs by connection elements of a first set of connection elements. The connection elements of the first set of connection elements do not produce a fixed connection between the cover disk elements on the radial inner side of the damper springs.

8 Claims, 5 Drawing Sheets

US 8,465,371 B2

TORSIONAL VIBRATION DAMPER ASSEMBLY FOR A HYDRODYNAMIC COUPLING DEVICE

BACKGROUND OF THE INVENTION

1. Field of the Invention

The present invention is directed to a torsional vibration damper assembly for a hydrodynamic coupling device, i.e., a torque converter, comprising a primary side with two cover disk elements, a secondary side which is rotatable with respect to the primary side around an axis of rotation against the action of a plurality of damper springs and which has a central disk element engaging between the cover disk elements, and a turbine wheel with a turbine wheel shell, wherein the cover disk elements are fixedly connected to one another on the radial outer side of the damper springs.

2. Description of the Related Art

FIG. 1 shows a conventional torsional vibration damper assembly 10' which can be used, for example, in a hydrodynamic torque converter for building up fluid circulation by the turbine wheel to transmit torque or reinforce torque or to generate a damping functionality in the torque transmission path between the turbine wheel and an output member, such as a transmission input shaft, and in the torque transmission path between a housing of the hydrodynamic coupling device and the output member.

The torsional vibration damper assembly 10' comprises a torsional vibration damper region 12' with a primary side 14' and a secondary side 16'. The primary side 14' comprises two cover disk elements 18', 20' which are arranged at an axial distance relative to one another. An axial intermediate space remains between the cover disk elements 18', 20', where a center disk element 22' of the secondary side 16 is arranged therein. The two cover disk elements 18', 20' are deformed toward one another in their radial outer area, and are fixedly connected to one another at a plurality of circumferential positions by connection elements that are formed as rivet elements 24'. For example, a total of five such rivet elements 24' can be distributed along the circumference.

Torque transmission between the primary side 14' and the secondary side 16' is achieved by a plurality of damper springs 26' which are arranged successively in the circumferential direction, and which can possibly also comprise individual springs that are arranged to nest one inside the other. The damper springs 26' are received in spring windows of the cover disk elements 18', 20' on one side, and are arranged in spring windows of the center disk element 22' on the other side. The damper springs 26' are also supported, or can be supported, at circumferential end areas thereof for transmitting torque. Moreover, the radial outermost area of the cover disk element 18' is shaped such that the cover disk element 18' can be coupled by an axially extending toothing 28' to an output-side friction element carrier of a lockup clutch for joint rotation.

The two cover disk elements 18', 20' are fixedly connected to one another on the radial inner side of the damper springs 26', with respect to their position at an axial distance from one another, by rivet elements 30' formed as spacer pins. These rivet elements 30' penetrate associated circumferential cutouts 32' in the center disk element 22' to permit relative rotation between the primary side 14' and the secondary side 16'. The torsional vibration damper region 12' is fixedly connected by the rivet elements 30' to the radial inner area of a turbine wheel shell 34' of a turbine wheel 36'. Accordingly, the spacer pins or rivet elements 30' serve not only to provide the fixed connection of the two cover disk elements 18', 20' to one another in their area on the radial inner side of the damper springs 26', but also simultaneously to provide the fixed connection between the torsional vibration damper region 12' and the turbine wheel 36'.

A torque introduced via a lockup clutch or the turbine wheel 36' into the primary side 14', i.e., the cover disk elements 18', 20', is transmitted by the damper springs 26' to the center disk element 22' of the secondary side 16'.

In its radial inner area, the center disk element 22' has an output hub 38' which is formed, e.g., with teeth and which generally acts as an output member of the torsional vibration damper arrangement 10' and can be coupled, for example, with a transmission input shaft so as to be fixed with respect to rotation relative to it.

SUMMARY OF THE INVENTION

It is an object of the invention to provide a torsional vibration damper assembly having an improved connection between the turbine wheel and torsional vibration damper region.

These and other objects and advantages are achieved in accordance with the invention by a torsional vibration damper assembly for a hydrodynamic coupling device, i.e., a torque converter, comprising a primary side having two cover disk elements, a secondary side which is rotatable with respect to the primary side about an axis of rotation against the action of a plurality of damper springs and which has a central disk element engaging between the cover disk elements, and a turbine wheel having a turbine wheel shell. Here, the cover disk elements are fixedly connected to one another on the radial outer side of the damper springs, and a cover disk element, which is located directly adjacent to the turbine wheel shell, is fixedly connected to the turbine wheel shell on the radial inner side of the damper springs by connection elements of a first set of connection elements. In addition, the connection elements of the first set of connection elements do not produce a fixed connection between the cover disk elements on the radial inner side of the damper springs.

In accordance with the invention, the torsional vibration damper assembly is constructed such that the fixed connection between the turbine wheel and the cover disk element directly adjacent to turbine wheel is produced by the connection elements of a first set of connection elements, which need not also simultaneously fulfill the function of fixedly connecting the cover disk elements to one another. As a result, the quantity and also the positioning of these connection elements of the first set of connection elements can be freely selected, i.e., without needing to also take the same precautions on the secondary side or center disk element against these connection elements impairing relative rotation. This can be used to advantageously realize a more stable construction in the area of the center disk element, and to produce a more stable connection between the turbine wheel shell and the cover disk element directly adjacent to the latter.

In a simply constructed embodiment, the cover disk elements are fixedly connected to one another on the radial outer side of the damper springs by the connection elements of a second set of connection elements.

In another embodiment, the cover disk elements can be fixedly connected to one another on the radial inner side of the damper springs by the connection elements of a third set of connection elements. Here, in addition to the connection elements of the first set of connection elements on the radial inner side of the damper springs, connection elements of the third set of connection elements are also provided such that even greater stability is achieved for connecting the cover disk elements to one another. It is further preferably provided that the turbine wheel shell is fixedly connected to the cover disk element, which is directly adjacent to it, by the connection elements of the third set of connection elements so that a greater stability of the connection between the turbine wheel shell and the cover disk element directly adjacent to it can be achieved.

In order to provide a simple way to arrange the connection elements of the first set of connection elements in the embodiment that includes an additional, third set of connection elements, in an alternative embodiment fastening brackets that project radially inward at an inner circumferential area and having therebetween intermediate spaces which open toward the radial inner side are provided at the cover disk element not directly adjacent to the turbine wheel shell for the connection elements of the third set of connection elements.

In another embodiment, which is particularly advantageous for reasons of symmetry and to prevent an unbalance, the quantity of connection elements of the first set of connection elements corresponds to the quantity of connection elements of the third set of connection elements. Further, at least one connection element of the first set of connection elements and at least one connection element of the third set of connection elements for forming connection element groups can have in each instance a smaller distance relative to one another than the distance between the groups of connection elements. Further, it is advantageous when the connection elements of the first set of connection elements are provided with a substantially uniform mutual distance in circumferential direction.

In yet another alternative embodiment, at least two respective connection elements of the first set of connection elements for forming connection element groups are provided with a smaller distance relative to one another than the connection element groups relative to one another.

In another embodiment that is advantageously stable, connection elements of the first set of connection elements and/or the connection elements of the second set of connection elements and/or the connection elements of the third set of connection elements are formed as rivet elements.

According to another aspect, the disclosed invention is directed to a hydrodynamic coupling device, particularly a torque converter, comprising a housing with a pump wheel and, in an internal space of the housing, a torsional vibration damper assembly according to the invention.

Other objectives and advantages of the invention will become apparent from the following detailed description considered in conjunction with the accompanying drawings and diagrams. The principles and features of the invention may be used in various different embodiments without departing from the scope of the invention.

BRIEF DESCRIPTION OF THE DRAWINGS

The various features, functions and advantages characterizing the invention will be better understood by reference to the detailed description which follows, taken in conjunction with the accompanying drawings, in which.

DETAILED DESCRIPTION OF THE EXEMPLARY EMBODIMENTS

Figure 1:
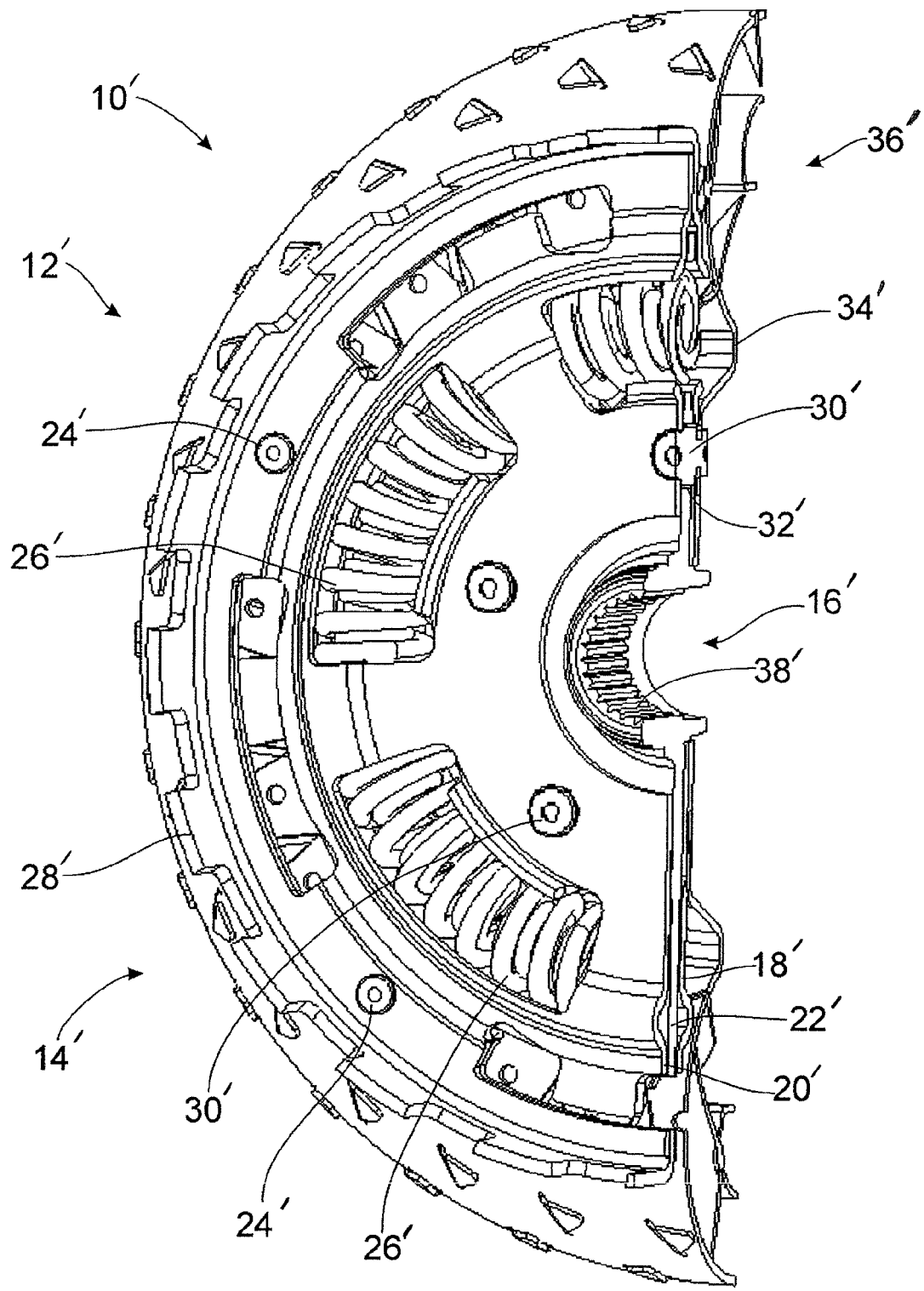
FIG. 1 shows a perspective longitudinal sectional view of a conventional torsional vibration damper assembly.

A first constructional variant of a torsional vibration damper assembly constructed according to the invention is described with reference to FIGS. 2 and 3. Regarding the basic construction with respect to the torsional vibration damper region and turbine wheel, the present embodiment corresponds to the construction described above in reference to FIG. 1. Therefore, reference is also had in this respect to the preceding remarks. In addition, identical components or assemblies are designated by identical reference numbers.

Figure 2:
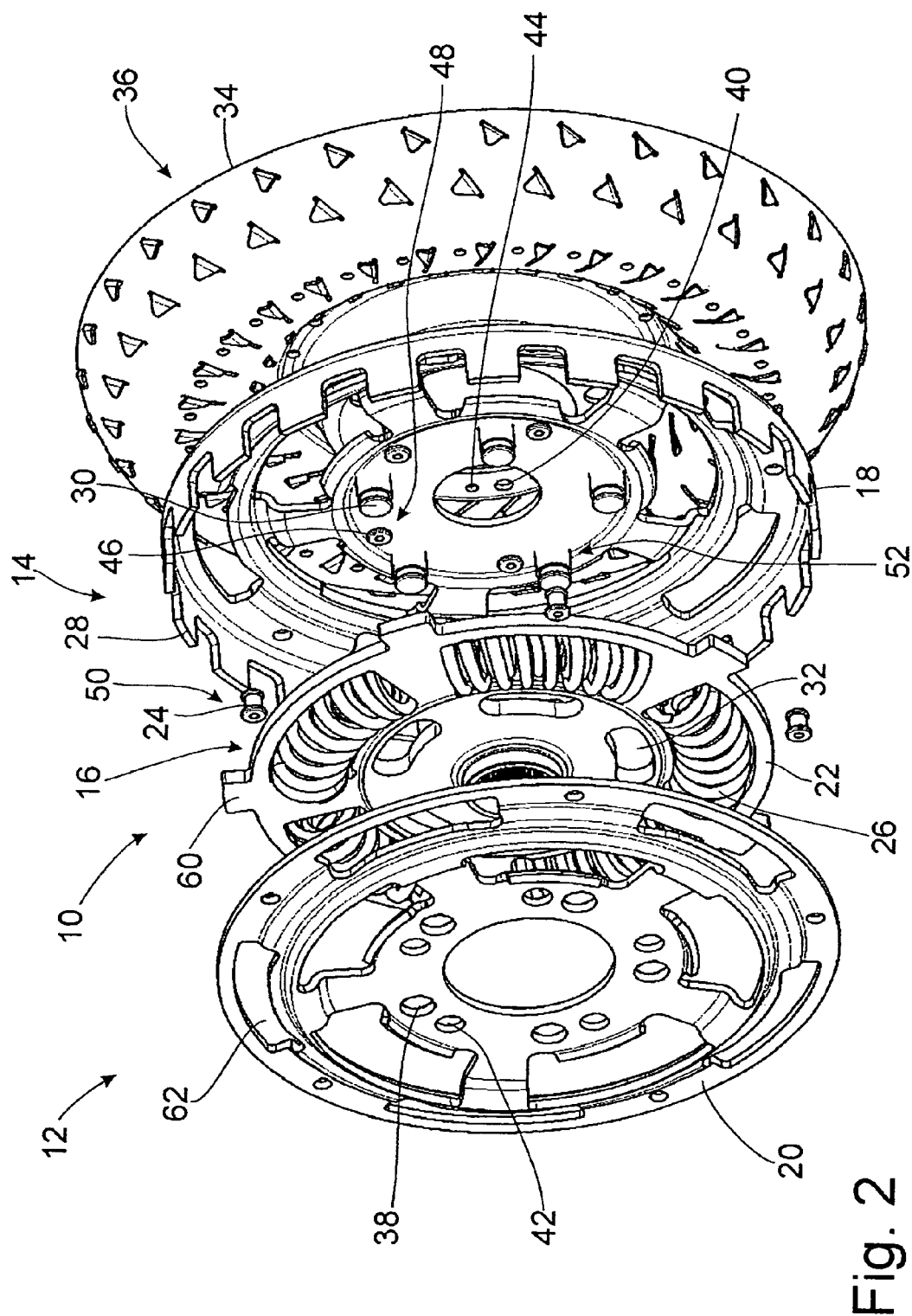
FIG. 2 shows an exploded view of a torsional vibration damper assembly in accordance with the invention.

FIG. 2 shows openings 38 and 40 for the rivet elements 30 in the cover disk element 20, not directly adjacent to the turbine wheel 36, and in the turbine wheel shell 34. Also shown are the openings 32, located in the center disk element 22, which are elongated in the circumferential direction and through which the rivet elements 30 extend so as not to impede a relative rotation between the primary side 14 and secondary side 16. It should be appreciated that openings of this kind for the rivet elements 30 corresponding to the openings 38 and 40 are also provided in the cover disk element 18 directly adjacent to the turbine wheel shell 34.

Also shown in FIG. 2 next to the openings 38, 40 are openings 42, 44 in the cover disk element 20 and in the radial inner area of the turbine wheel shell 34, respectively. These openings 42, 44 and corresponding openings provided in the cover disk element 18 are provided for rivet elements 46. In addition to the rivet elements 30, rivet elements 46 produce a fixed rivet connection between the cover disk element 18 and the turbine wheel shell 34. The openings 42 provided in the cover disk element 20 serve to provide a way to access the rivet elements 46 with a rivet tool through the cover disk element 20 and openings 32 in the center disk element so that the rivet elements 46 can be deformed to produce the fixed rivet connection to the turbine wheel shell 34.

Accordingly, there are basically three sets of rivet elements provided in these design variants. A first set 48 of rivet elements comprises rivet elements 46 and serves only to produce a connection between the cover disk element 18 directly adjacent to the turbine wheel shell 34 and the turbine wheel shell 34. The rivet elements 46 of this first set of rivet elements 48 do not extend into the area of the center disk element 32 and, therefore, do not impede its ability to rotate relative to the primary side 14. A second set 50 of rivet elements comprises rivet elements 24 for implementing a fixed connection between the cover disk elements 18, 20 on the radial outer side of the damper springs 26, these cover disk elements 18, 20 also being bent toward one another in that area. Finally, a third set 52 of rivet elements comprises the spacer pins or rivet elements 30 which provide a fixed connection between the two cover disk elements 18, 20 on the radial inner side of the damper springs 26, as well as a fixed connection of the cover disk element 18 and, therefore, of the entire torsional vibration damper region 12 to the turbine wheel shell 34. Accordingly, a greater stability of the connection between the torsional vibration damper region 12 and the turbine wheel 36 is produced without impairing the rotatability of the primary side 14 relative to the secondary side 16.

In order to produce the rivet connection using the first set 48 of rivet elements, it may be required to apply a torque to the primary side 14 or secondary side 16 to ensure that the center disk element 22 is oriented in the circumferential direction with respect to the openings 42 and 44 and the rivet elements 46 such that a rivet tool can also be guided through these openings 32. A rivet element 46 of the first set 48 of rivet elements and a rivet element 30 of the third set 52 of rivet elements are arranged directly adjacent to one another and therefore form a group of rivet elements as shown in FIGS. 2 and 3, where these groups of rivet elements having a greater relative distance from one another. Consequently, there is still sufficient space in the openings 32 next to the rivet elements 30, which are arranged, e.g., centrally in the openings 42, for the insertion of a rivet tool even when the primary side 14 or secondary side 16 is not loaded by torque.

The drawings further show projections 60 extending radially outward are formed in the radial outer area of the center disk element 22 and are movable received in the circumferential direction and in circumferential cutouts 62 formed jointly by the cover disk elements 18, 20. The projections 60 provide the function of limiting the angle of rotation of the primary side 14 relative to the secondary side 16, as an alternative to or in addition to the rivet elements 30 moving in the openings 32.

Figure 3:
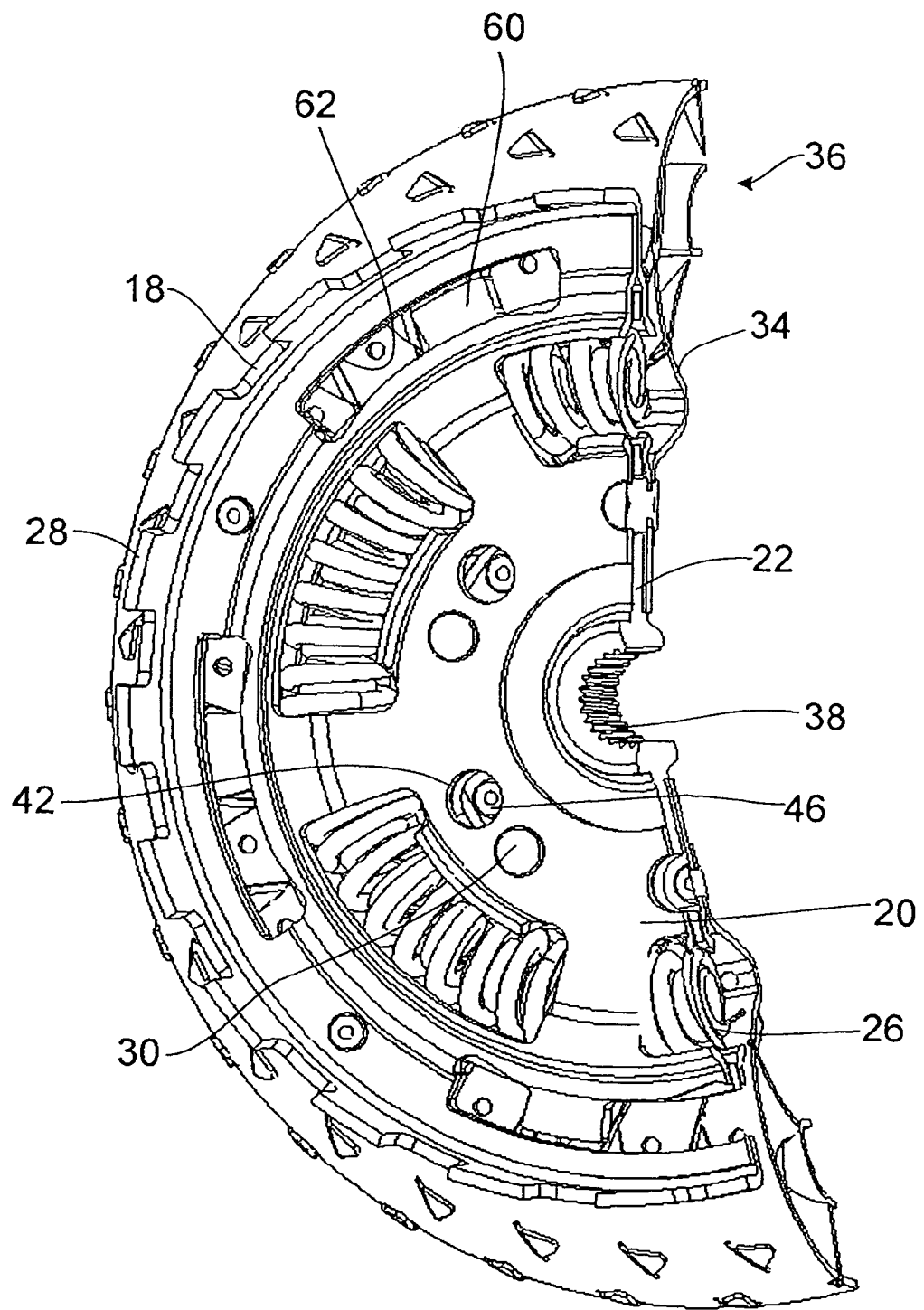
FIG. 3 shows a perspective longitudinal sectional view of the torsional vibration damper assembly shown in FIG. 2.
Figure 4:
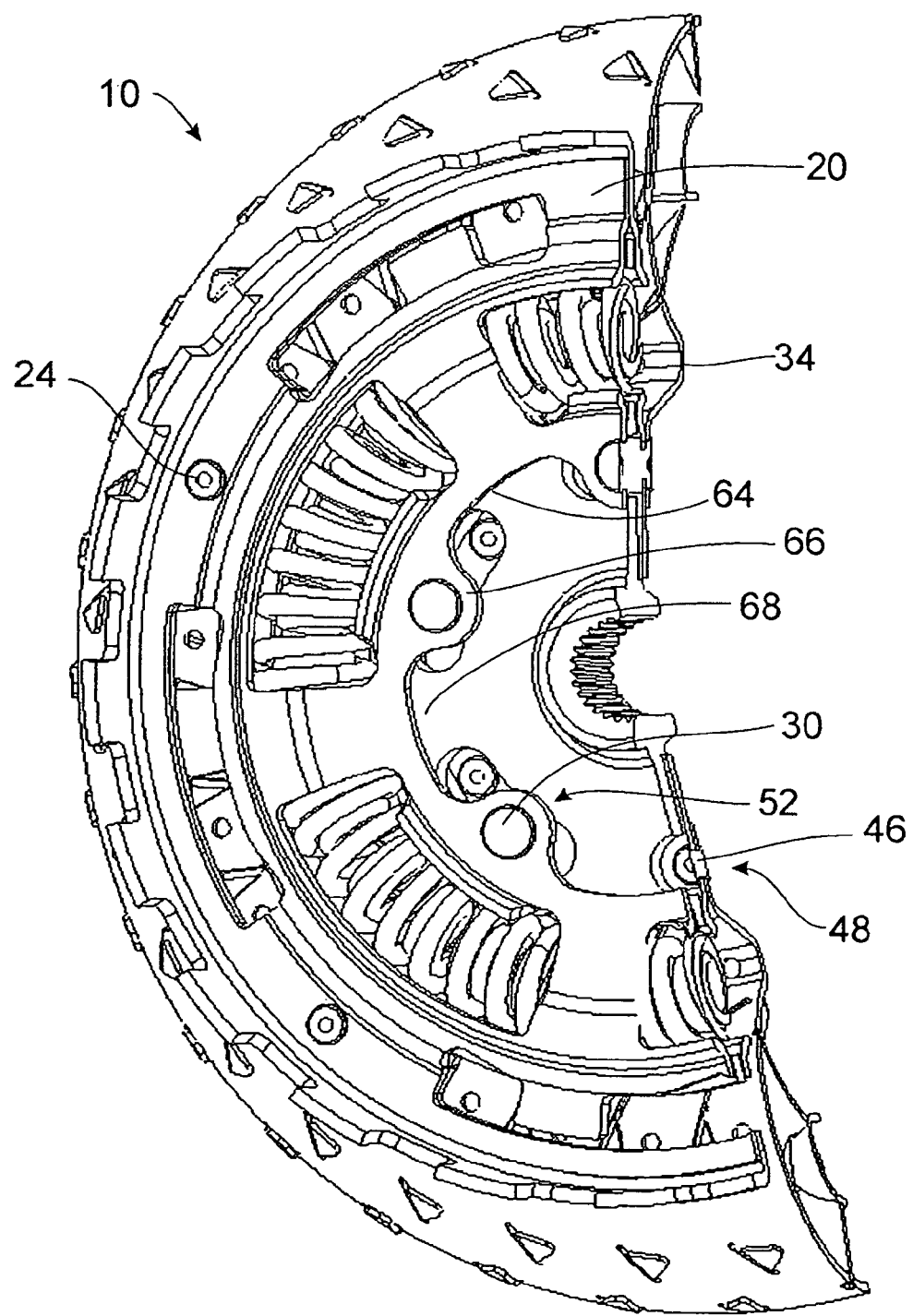
FIG. 4 shows an embodiment of the form of the torsional vibration damper of FIG. 3.

FIG. 4 shows an embodiment of the form of the torsional vibration damper of FIG. 3. The present embodiment substantially corresponds to the embodiment described above in FIGS. 2 to 3 and, therefore, reference is had to the preceding remarks. However, fastening brackets 66 that extend radially inward at the inner circumferential area 64 are provided at the cover disk element 20 that is located at a farther distance from the turbine wheel shell 34, where the rivet elements 30 of the third set 52 of rivet elements are fastened to these fastening brackets 66. As additionally shown in FIG. 4, cutouts 68 that open radially inward are provided between these fastening brackets 66 and permit direct access to the rivet elements 46 of the first set 48.

Figure 5:
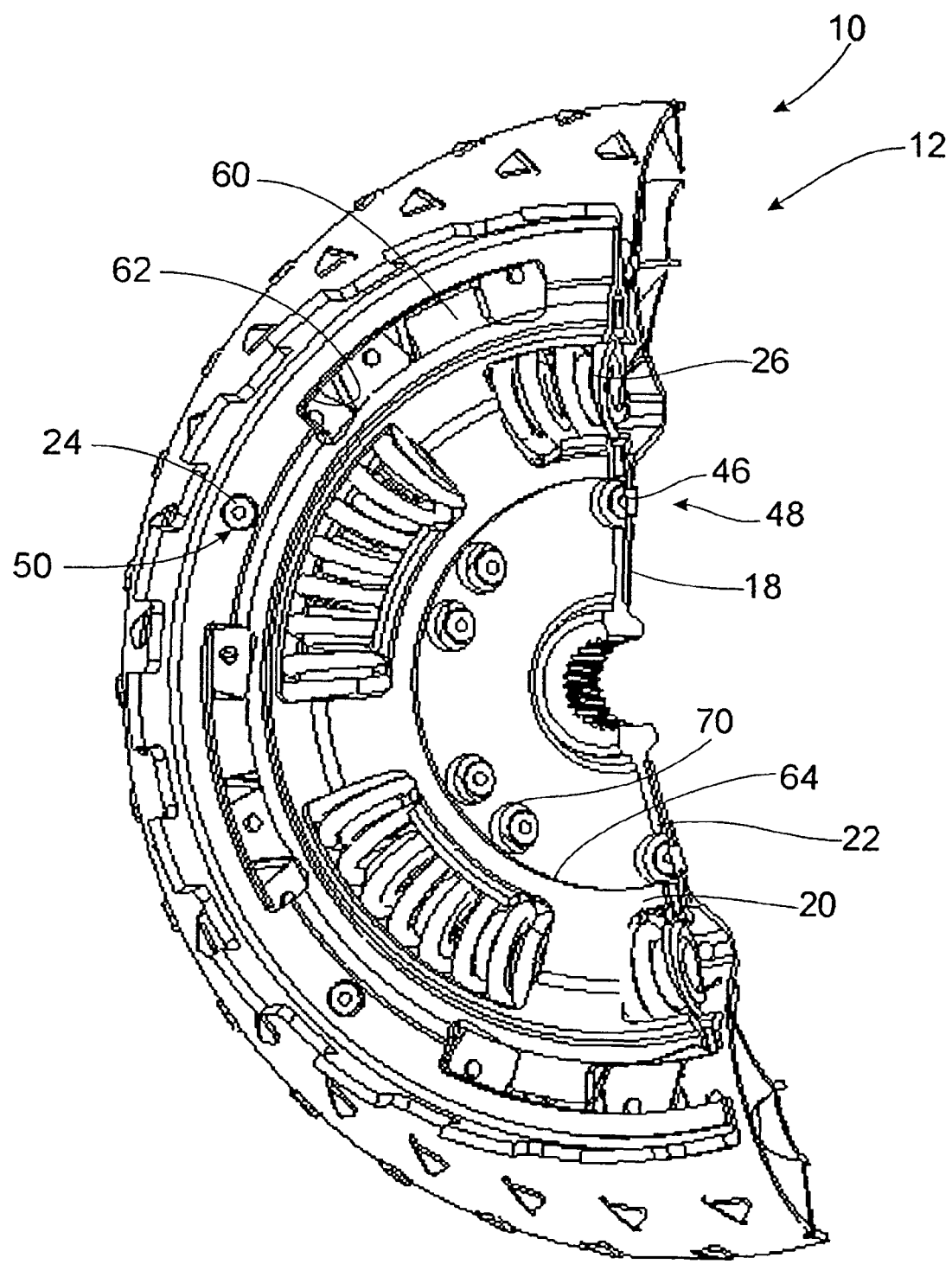
FIG. 5 shows an alternative embodiment of the torsional vibration damper of FIG. 3.

In another alternative embodiment shown in FIG. 5, only the rivet elements 46 of the first set 48 and the rivet elements 24 of the second set 50 of rivet elements are provided; that is, no rivet elements are provided for providing the functionality of the spacer pins of the prior above-described embodiments, and the two cover disk elements 18, 20 are fixedly connected to one another by riveting only in their radial outer area, i.e., on the radial outer side of the damper springs 26. Here, the cover disk element 20 terminates on the radial inner side with its inner circumferential area 64 at the radial outer side of the rivet elements 46 of the first set 48 of rivet elements.

Openings 70 are provided in the center disk element 22 in association with the rivet elements 46 which are again assembled in groups or by pairs in this case. These openings 70 are positioned such that, with respect to the rivet elements 46, they lie directly above the rivet elements 46 in the unloaded state of the torsional vibration damper region 12, and such that there is accordingly direct access to the rivet elements 46 through the radial inner, open area of the cover disk element 20 and the openings so that these rivet elements 46 can be deformed to produce the fixed rivet connection.

It should be noted that various modifications of the torsional vibration damper assembly 10 according to the invention can be performed within the scope of the present invention. For example, the quantity of rivet elements, i.e., the first set of rivet elements, and their position relative to one another can vary. Moreover, the quantity of damper springs and their positioning can differ from the constructions and locations shown herein. It should be further noted that other connection elements, e.g., screw elements can also be used instead of rivet elements, although the use of rivet elements is preferable because of the high stability and practically nonexistent risk of them loosening.

Thus, while there are shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A torsional vibration damper assembly for a hydrodynamic coupling device, comprising:
   a primary side having a plurality of cover disk elements;
   a secondary side which is rotatable with respect to the primary side about an axis of rotation against an action of a plurality of damper springs, the secondary side comprising a central disk element engaging between said plural cover disk elements; and
   a turbine wheel with a turbine wheel shell;
   wherein said plural cover disk elements are fixedly connected to one another on a radial outer side of the damper springs and one of the cover disk elements that is located directly adjacent to the turbine wheel shell is fixedly connected to the turbine wheel shell on a radial inner side of each of said plural damper springs by connection elements of a first set of connection elements; and
   wherein the connection elements of the first set of connection elements do not produce a fixed connection between the cover disk elements on the radial inner side of each of said plural damper springs and said plural cover disk elements are fixedly connected to one another on the radial inner side of the damper springs by connection elements of a third set of connection elements,
   wherein the turbine wheel shell is fixedly connected to a directly adjacent cover disk element by the connection elements of the third set of connection elements.

2. The torsional vibration damper assembly according to claim 1, wherein the connection elements of the first set of connection elements are provided with a substantially uniform mutual distance in a circumferential direction.

3. The torsional vibration damper assembly according to claim 1, wherein said plural cover disk elements are fixedly connected to one another on the radial outer side of the damper springs by connection elements of a second set of connection elements.

4. .The torsional vibration damper assembly according to claim 3, wherein connection elements of at least one of the first set of connection elements, the connection elements of the second set of connection elements and the connection elements of the third set of connection elements form rivet elements.

5. A torsional vibration damper assembly for a hydrodynamic coupling device, comprising:
   a primary side having a plurality of cover disk elements;
   a secondary side which is rotatable with respect to the primary side about an axis of rotation against an action of a plurality of damper springs, the secondary side comprising a central disk element engaging between said plural cover disk elements;
   a turbine wheel with a turbine wheel shell;
   wherein said plural cover disk elements are fixedly connected to one another on a radial outer side of the damper springs and one of the cover disk elements that is located directly adjacent to the turbine wheel shell is fixedly connected to the turbine wheel shell on a radial inner side of each of said plural damper springs by connection elements of a first set of connection elements; and wherein the connection elements of the first set of connection elements do not produce a fixed connection between the cover disk elements on the radial inner side of each of said plural damper springs and said plural cover disk elements are fixedly connected to one another on the radial inner side of the damper springs by connection elements of a third set of connection elements; and fastening brackets projecting radially inward at an inner circumferential area and having therebetween intermediate spaces which open toward the radial inner side, said fastening brackets being provided at the cover disk element not directly adjacent to the turbine wheel shell for the connection elements of the third set of connection elements.

6. A torsional vibration damper assembly for a hydrodynamic coupling device, comprising:
   a primary side having a plurality of cover disk elements;
   a secondary side which is rotatable with respect to the primary side about an axis of rotation against an action of a plurality of damper springs, the secondary side comprising a central disk element engaging between said plural cover disk elements; and
   a turbine wheel with a turbine wheel shell;
   wherein said plural cover disk elements are fixedly connected to one another on a radial outer side of the damper springs and one of the cover disk elements that is located directly adjacent to the turbine wheel shell is fixedly connected to the turbine wheel shell on a radial inner side of each of said plural damper springs by connection elements of a first set of connection elements,
   wherein the connection elements of the first set of connection elements do not produce a fixed connection between the cover disk elements on the radial inner side of each of said plural damper springs and said plural cover disk elements are fixedly connected to one another on the radial inner side of the damper springs by connection elements of a third set of connection elements, and
   wherein a quantity of connection elements of the first set of connection elements corresponds to the quantity of connection elements of the third set of connection elements.

7. A torsional vibration damper assembly for a hydrodynamic coupling device, comprising:
   a primary side having a plurality of cover disk elements;
   a secondary side which is rotatable with respect to the primary side about an axis of rotation against an action of a plurality of damper springs, the secondary side comprising a central disk element engaging between said plural cover disk elements; and
   a turbine wheel with a turbine wheel shell;
   wherein said plural cover disk elements are fixedly connected to one another on a radial outer side of the damper springs and one of the cover disk elements that is located directly adjacent to the turbine wheel shell is fixedly connected to the turbine wheel shell on a radial inner side of each of said plural damper springs by connection elements of a first set of connection elements; and
   wherein the connection elements of the first set of connection elements do not produce a fixed connection between the cover disk elements on the radial inner side of each of said plural damper springs and said plural cover disk elements are fixedly connected to one another on the radial inner side of the damper springs by connection elements of a third set of connection elements,
   wherein at least one connection element of the first set of connection elements and at least one connection element of the third set of connection elements for forming connection element groups each have a smaller distance relative to one another than the distance between connection elements of one of the first and third groups of connection elements.

8. A torsional vibration damper assembly for a hydrodynamic coupling device, comprising:
   a primary side having a plurality of cover disk elements;
   a secondary side which is rotatable with respect to the primary side about an axis of rotation against an action of a plurality of damper springs, the secondary side comprising a central disk element engaging between said plural cover disk elements; and
   a turbine wheel with a turbine wheel shell;
   wherein said plural cover disk elements are fixedly connected to one another on a radial outer side of the damper springs and one of the cover disk elements that is located directly adjacent to the turbine wheel shell is fixedly connected to the turbine wheel shell on a radial inner side of each of said plural damper springs by connection elements of a first set of connection elements; and
   wherein the connection elements of the first set of connection elements do not produce a fixed connection between the cover disk elements on the radial inner side of each of said plural damper springs,
   wherein at least two respective connection elements of the first set of connection elements for forming connection element groups have a smaller distance relative to one another than the connection element groups relative to one another.

* * * * *